Aug. 8, 1950 C. A. GUSTAFSON 2,517,871
TRANSMISSION SHIFTING MECHANISM
Filed Oct. 23, 1945 2 Sheets-Sheet 2
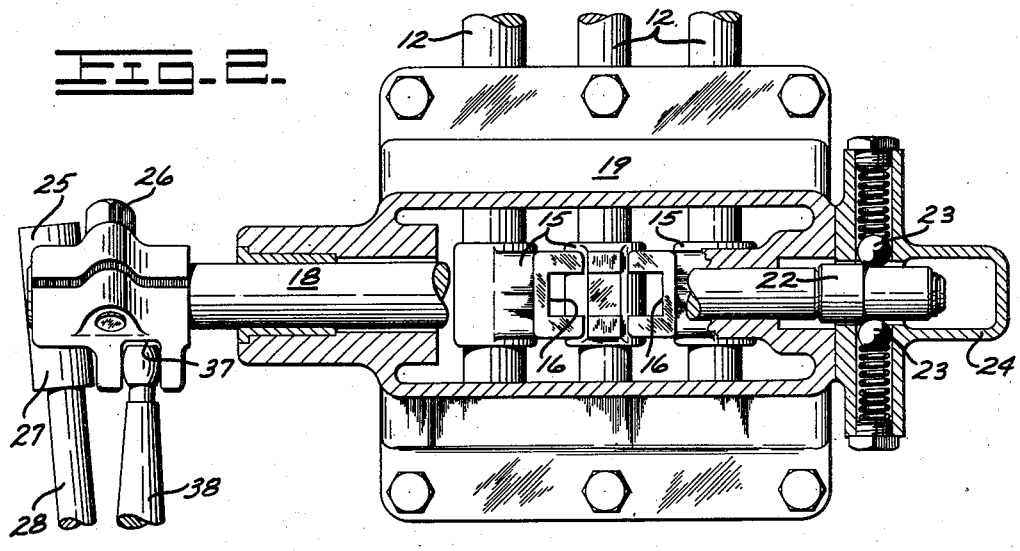
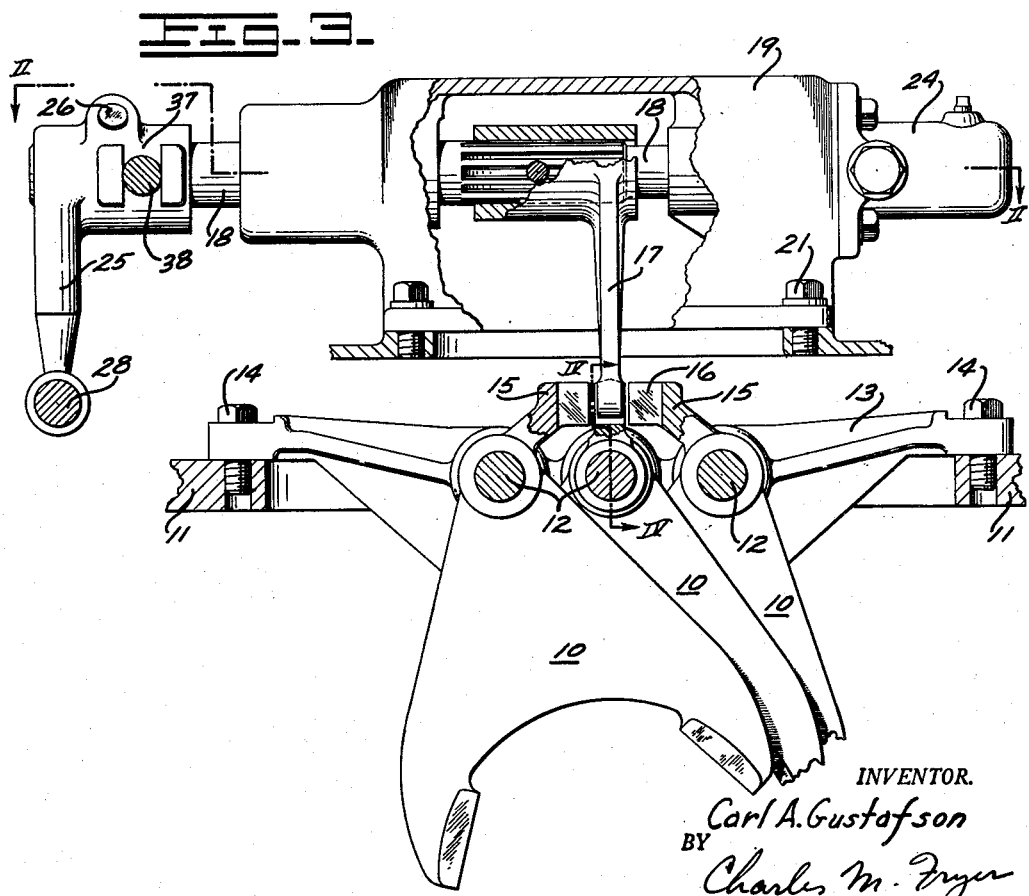
INVENTOR.
Carl A. Gustafson
BY
Charles M. Fryer
ATTORNEY.

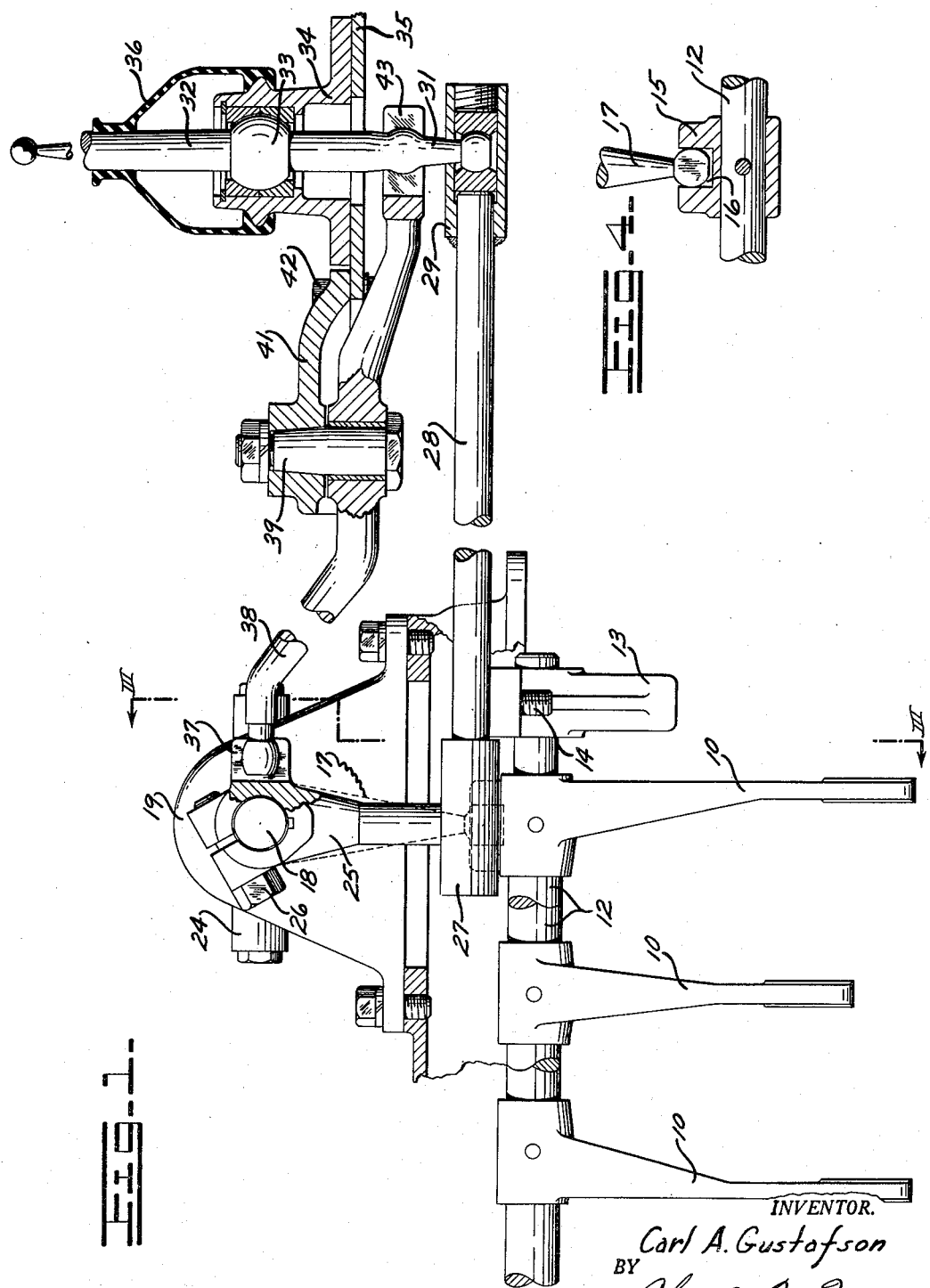

Patented Aug. 8, 1950

2,517,871

UNITED STATES PATENT OFFICE 2,517,871

TRANSMISSION SHIFTING MECHANISM

Carl A. Gustafson, Peoria, Ill., assignor to Caterpillar Tractor Co., Peoria, Ill., a corporation of California Application October 23, 1948, Serial No. 56,120

2 Claims. (Cl. 74—473)

This invention relates to a shifting mechanism for gear type transmissions in general and more particularly to a control mechanism for shifting the gears from a remote position.

The mechanism herein described is employed in conjunction with an ordinary gear type transmission in which slidable gears are manipulated to mesh with other gears for changing the driving ratio. In the past, when the manually actuated control lever was moved to a location other than directly over the transmission gears, the connecting linkage became quite complicated and usually included a plurality of canes requiring an excessive amount of vertical clearance for satisfactory operation.

It is an object of the present invention to provide a remotely controlled transmission shifting mechanism of simple design and positive operation adapted for use wherein the vertical clearance to accommodate the mechanism is relatively small. It is also an object of this invention to provide a remote control mechanism for shifting the gears in a transmission or the like which permits unusual freedom in the location of the operator's control and which eliminates the necessity of more than a single main shifting cane. Further objects and advantages of this invention will be made apparent in the following specification wherein reference is made to the accompanying drawings.

In the drawings:

Fig. 1 is a fragmentary view in side elevation of a gear shifting mechanism embodying the present invention with parts broken away to more clearly show the construction;

Fig. 2 is a sectional view taken along line II—II of Fig. 3;

Fig. 3 is a sectional view taken along line III—III of Fig. 1; and

Fig. 4 is a fragmentary sectional view taken along line IV—IV of Fig. 3.

Fig. 1 illustrates the shifting mechanism in its association with a number of shifter forks, three of which are illustrated at 10. The shifter forks are of the type normally employed for shifting the gears in a transmission (not shown) but which are disposed within a transmission case, a part of which is indicated at 11 in Fig. 3. Each of the shifter forks is rigidly secured to a shifter rail 12, the ends of which rails are supported for longitudinal sliding movement in suitable brackets, one of which is illustrated at 13 secured to the transmission case by means of cap screws 14. A collar 15 is secured to each of the shifter rails and the collars are disposed closely adjacent to each other in such a manner that slots 16 provided in each of the collars may be aligned as illustrated in Fig. 2.

As shown in Fig. 3, the slots 16 are adapted to receive the lower end of a shifting finger 17 rigidly secured to a shaft 18, extending through and supported for rocking as well as longitudinal sliding movement in a housing 19 secured to the transmission case by means of cap screws 21. The shaft 18 is provided with an enlargement 22 adapted to cooperate with a pair of diametrically opposed spring pressed balls 23 contained within a housing 24. This permits the operator to identify by feel position of the finger 17 relative to the shifter collars. That is engagement of the balls 23 against the opposite shoulders of the enlargement 22 takes place when the finger is engaged with one or the other of the outside shifting collars. When the central shifting collar is engaged, the balls are riding freely on the smooth portion of the enlargement.

A lever 25 is clamped as by cap screw 26 to the extending end of the shaft 18 and at its opposite end, the lever is connected by a universal connection 27 to one end of a link 28. The opposite end of the link is connected by a universal connection 29 to the cane end 31 of a manual control lever 32. The control lever 32 is universally supported as is illustrated at 33 in a housing 34, rigidly secured to a plate 35 which forms the floor of the operator's station. A resilient boot is associated with the control lever 32 as illustrated at 36 to exclude dirt and other foreign materials. The lever 25 is also provided with a slotted recess 37 for the reception of one end of a lever 38 pivotally supported by means of a pin 39 from a bracket 41 rigidly secured to the floor plate as by a cap screw 42. The opposite end of the lever 38 is bifurcated forming an elongated opening 43 through which the cane 31 of the control lever 32 extends.

In operation, swinging of control lever 32 in a transverse direction relative to the longitudinal axis of the shifter rails 12 results in the lever 38 rocking about its pivotal support 39 causing the shaft 18 to slide axially in the housing 19 thus permitting selection of the shifter collar with which the cane 17 is engaged. Swinging of the control lever in a direction parallel to the shifter rails results in the shaft 18 being rocked about its axis effecting longitudinal sliding of the selected shifter rail and its associated gear. During movement of the control lever 32 in this direction, the lever 38 is not actuated as the cane 31 is free to move within the opening 43 formed by the bifurcated end of the lever.

I claim:

1. In a combination with a gear transmission having a plurality of shifting forks adapted to be selectively engaged and shifted to effect changes in gear ratio and having a finger engageable with said forks and carried by a shaft for selective engagement with the forks upon sliding of the shaft and shifting of the engaged fork upon rocking of the shaft, a manually actuated shifting cane remotely positioned from said shaft, a lever pivoted centrally of its length engaging the shaft at one end and the cane at the other end to effect sliding of the shaft when the cane is swung in one direction and a separate linkage between the cane and the shaft to effect rocking of the shaft when the cane is swung in a transversely opposite direction.

2. In combination with a gear transmission having a plurality of shifting forks adapted to be selectively engaged and shifted to effect changes in gear ratio and having a finger engageable with said forks and carried by a shaft for selective engagement with the forks upon sliding of the shaft and shifting of the engaged fork upon rocking of the shaft, a manually actuated shifting cane remotely positioned from said shaft, a lever pivoted centrally of its length engaging the shaft at one end and the cane at the other end to effect sliding of the shaft when the cane is swung in one direction, a separate linkage between the cane and the shaft to effect rocking of the shaft when the cane is rocked in a transversely opposite direction, and a slotted connection between the pivoted lever and the cane to permit free movement of the cane as it effects rocking of the shaft through said linkage.

CARL A. GUSTAFSON.

REFERENCES CITED

The following references are of record in the file of this patent:

UNITED STATES PATENTS

| Number | Name | Date |
|---|---|---|
| 2,252,080 | Lapsley | Aug. 12, 1941 |

FOREIGN PATENTS

| Number | Country | Date |
|---|---|---|
| 342,718 | Great Britain | Feb. 4, 1931 |